US008431863B2

(12) United States Patent
Kindig

(10) Patent No.: US 8,431,863 B2
(45) Date of Patent: Apr. 30, 2013

(54) INTEGRATED WELD GUN HOLDER AND CABLE MANAGEMENT SYSTEM

(75) Inventor: Michael A. Kindig, Chagrin Falls, OH (US)

(73) Assignee: Lincoln Global, Inc., City of Industry, CA (US)

( * ) Notice: Subject to any disclaimer, the term of this patent is extended or adjusted under 35 U.S.C. 154(b) by 712 days.

(21) Appl. No.: 12/607,437

(22) Filed: Oct. 28, 2009

(65) Prior Publication Data
US 2011/0095009 A1    Apr. 28, 2011

(51) Int. Cl.
B23K 9/10    (2006.01)
(52) U.S. Cl.
USPC ......... 219/130.1; 219/133; 219/136; 219/138
(58) Field of Classification Search ............... 219/130.1, 219/133, 136, 138; 206/234, 722
See application file for complete search history.

(56) References Cited

U.S. PATENT DOCUMENTS

| 2,598,492 | A | 5/1952 | Boes |
| 2,805,777 | A | 8/1957 | Larson |
| 4,625,949 | A | 12/1986 | Walker |
| 4,942,281 | A | 7/1990 | Srba |
| 6,396,019 | B1 | 5/2002 | Williams |
| 6,499,608 | B1 | 12/2002 | Sterling et al. |
| 6,596,972 | B1 | 7/2003 | Di Novo et al. |
| 7,241,973 | B1 | 7/2007 | Di Novo et al. |
| 7,442,898 | B2 | 10/2008 | Di Novo et al. |
| 2005/0145587 | A1 | 7/2005 | Matthews |
| 2006/0059858 | A1 | 3/2006 | Layman |
| 2008/0135533 | A1* | 6/2008 | Ertmer et al. ............ 219/136 |

FOREIGN PATENT DOCUMENTS
JP    2000-30635    1/2000

OTHER PUBLICATIONS

Updated web page http://web.archive.org/web/20030709032209// http://www.prospot.com/pr2000/singlesided.html.
Updated web page http://www.tootoo.com/d-p24546226-automobile_plate_renovated_welding_machine/#.
Updated web page http://weldingoutfitter.com/dynasty350seriesmachineonly-1.aspx.

* cited by examiner

Primary Examiner — Toan Le
(74) Attorney, Agent, or Firm — Hahn Loeser & Parks LLP

(57) ABSTRACT

A welder includes a housing enclosing one or more welding circuits communicated with power output studs for establishing a welding arc. A generally rigid bracket may be included that is affixed to an exterior of the housing, which may include first and second spaced apart support arms extending from a bracket, where the first support arm includes a first supporting surface facing a first direction, and where the second support arm includes a second supporting surface facing a second opposite direction for supporting the associated welding gun in a cantilevered configuration. A cable cradle is also included that extends from a second, distal end of the bracket.

22 Claims, 2 Drawing Sheets

INTEGRATED WELD GUN HOLDER AND CABLE MANAGEMENT SYSTEM

TECHNICAL FIELD

The present invention pertains generally to equipment used in welding, and more particularly, to providing an integrated weld gun holder and cable management system.

BACKGROUND OF THE INVENTION

In recent decades, welding has become a dominant process in the manufacture and construction of various products. Applications for welding are widespread and used throughout the world for the construction and repair of ships, buildings, bridges, vehicles, and pipe lines, to name a few examples. Applications for welding even extend to the hobbyist. Portable welders allow the welder to perform his task on site instead of a factory floor. Because weld jobs are performed on site, there is an ongoing need to ensure that the entire portable welding unit can be safely and easily transported from site to site.

In portable welding units, all of the machinery necessary to weld metal is contained within a movable unit. Such portable welding units may include ground engaging wheels, and are further comprised of, among other items, an exterior weld gun and an exterior cable which must be moved with the unit during relocation. After completing a welding job, the weld gun is extremely hot and potentially hazardous. To reduce cable wear, some users pile the cable on top of the welding unit or wind the cable around a handle.

BRIEF SUMMARY

In one embodiment of the subject invention, a welder includes a housing enclosing one or more welding circuits for establishing a welding arc. A generally rigid bracket may be included that is affixed to an exterior of the housing, which may include first and second integrally formed and spaced apart support arms, wherein the first support arm includes a first concave supporting surface facing a first direction, and wherein the second support arm includes a second concave supporting surface facing a second opposite direction for supporting the associated welding gun in a cantilevered configuration. A cable cradle is also included that extends from a second, distal end of the generally rigid bracket to form a trough for receiving an associated cable.

DETAILED DESCRIPTION OF THE INVENTION

Figure 1:
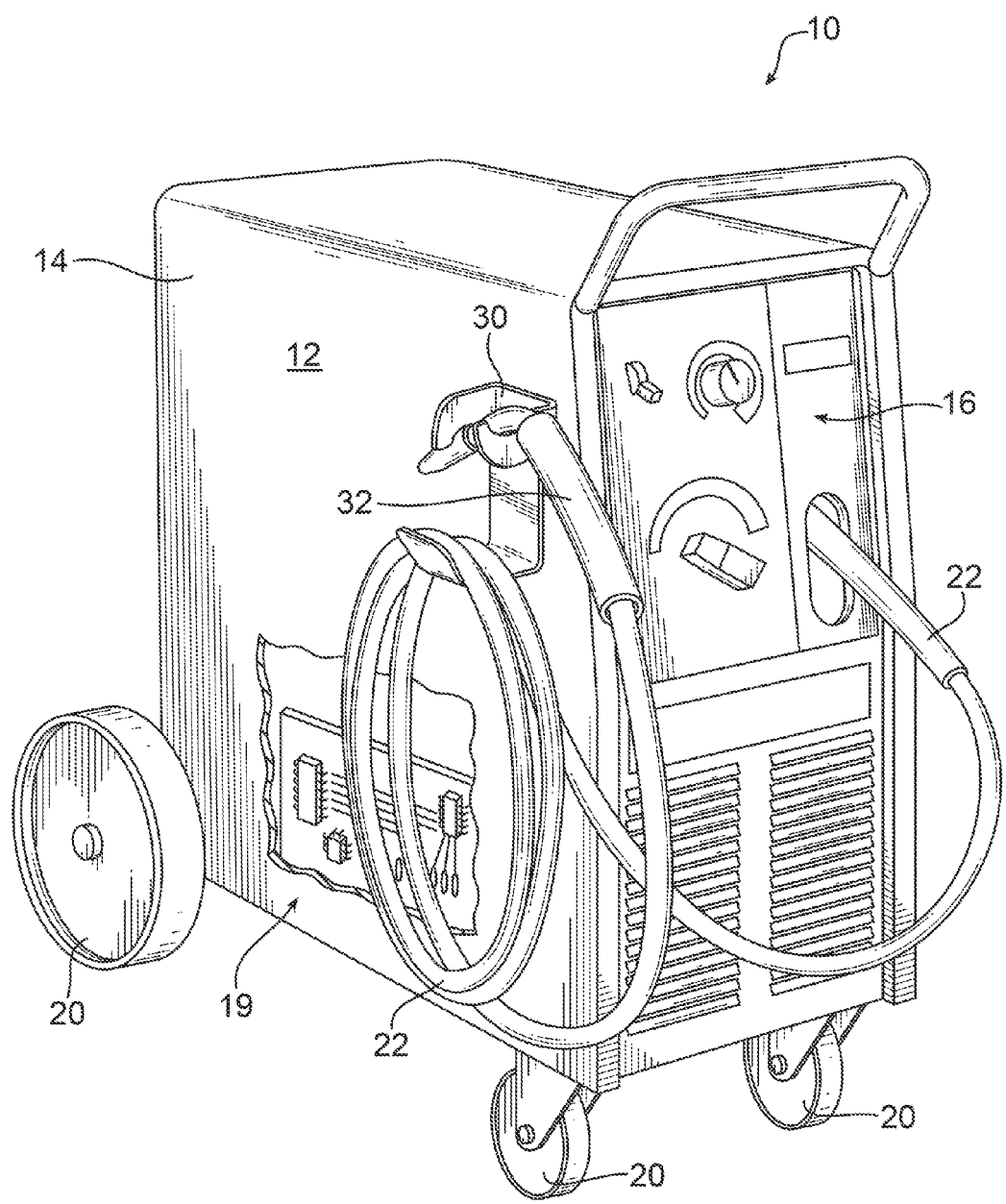
FIG. 1 is a perspective view of a welder with a holder for a welding gun and cables attached to the welder, according to the embodiments of the subject invention.

Referring now to the drawings wherein the showings are for purposes of illustrating embodiments of the invention only and not for purposes of limiting the same, FIG. 1 shows a welder depicted generally at 10. The welder 10 may include a power source 12 or power supply 12, which as described hereinafter is exemplary in nature. Persons of ordinary skill in the art will readily understand the application of the embodiments of the subject invention to any type of welding power source including both DC and AC output power. The power source 12 is illustrated as a Power MIG manufactured by the Lincoln Electric Company in Cleveland, Ohio. The power source 12 may be enclosed in a housing 14 including one or more ground engaging wheels 20 for use in maneuvering the welder 10 between worksites. An operator panel 16 is incorporated in one side of the housing 14. The operator panel 16 may include control knobs, switches and the like for adjusting the power source 12 settings. The power source 12 may also include welding cables 22 connected to power output terminals or studs, not shown. An electrode holder 32, which may be a welding gun 26, may extend from one end of welding cables 22 delivering welding wire supplied from a spool or other electrode source. A grounding cable, not shown, may also be included for connecting to a work piece, in a manner well known in the art. Power supply 12 may further include a wire drive system, not shown, utilizing one or more pairs of drive rollers and a drive motor. In one particular embodiment, the wire drive system may be included within the housing 14. However, separate or standalone wire feeders may be utilized without departing from the scope of coverage of the embodiments of the subject invention.

Power source 12 may receive power from an external source. In one embodiment, input power is directed to a transformer, not shown, having primary and secondary windings. The input power may be single phase power. However, power sources utilizing three phase power are also to be construed as falling within the scope of coverage of the embodiments of the subject invention. Power from the transformer may be directed to one or more power source rectifiers and/or inverters thereby conditioning the power in a manner suitable for welding. In this way, power source 12 includes one or more welding circuits 19 for establishing a welding arc. It is expressly noted here that any type of electrical or electronic circuitry may be used for delivering and/or conditioning welding power as is intended for use in establishing a welding arc.

Figure 2:
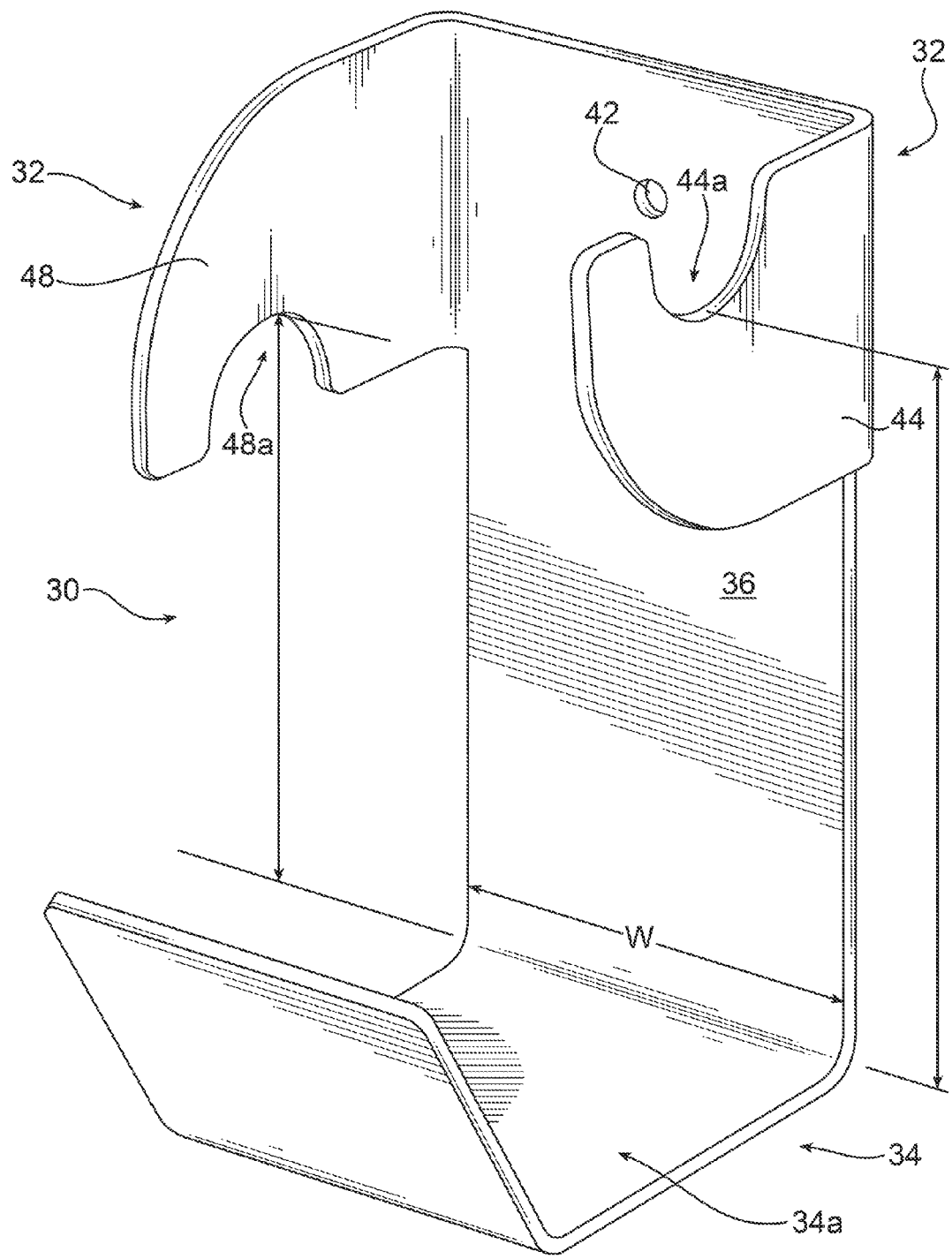
FIG. 2 is a perspective view of the holder for a welding gun and cables shown in FIG. 1, according to the embodiments of the subject invention.

With continued reference to FIG. 1 and now also to FIG. 2, welder 10 may include a bracket 30 holding or storing one or more components of welder 10. In particular, bracket 30 may function to hold the welding gun 26 when not in use by the operator. Additionally, bracket 30 may also function to store welding cables 22 attached to the welding gun 26. Accordingly, bracket 30 may include an electrode holder section, or electrode holder 32 and a cable holding section, or cable support 34. In one embodiment, both the electrode holder 32 and the cable support 34 are incorporated into a single contiguously formed unitary article. However, alternate embodiments are contemplated wherein the electrode holder 32 and the cable support 34 are comprised of individual bracket components assembled together and attached to the welder 10. In this way, bracket 30 provides means for managing storage of the welding gun 26 and cable 22 in a convenient and easily accessible manner.

With continued reference to FIGS. 1 and 2, bracket 30 may extend from an exterior of housing 14, or other portion of welder 10. Bracket 30 may be comprised of a separate component and fixedly attached to housing 14. In one particular embodiment, bracket 30 may be fastened to welder 10 via bolts, rivets, adhesives, welding, clips, hooks, or any means chosen with sound engineering judgment. In using removable fastening means, like threaded bolts for example, bracket 30 may include one or more apertures 42 for receiving the fastening means. Alternatively, bracket 30 may be integrally fashioned with the housing 14. Still, any manner of extending bracket 30 and any location of positioning bracket 30 on welder 10 may be chosen as is appropriate for use with the embodiments of the subject invention.

With reference to FIG. 2, bracket 30 comprises a base 36 or base portion 36, which may be constructed from a rigid and generally planar material. For example, base 36 may be constructed from mild steel or other metal alloys. Other examples of materials used may include polymeric material. Still, any type of material may be used that is non-combustible, has sufficient rigidity and can withstand repeated exposure to a hot welding gun 26.

The electrode holder 32 may be comprised of a supporting structure that holds the welding gun 26 in a cantilevered configuration. By cantilevered, it is meant that the welding gun 26 is supported substantially at one end of the welding gun 26. In particular, the electrode holder 32 may comprise a hooking device that grasps the neck of the welding gun 26. It will be readily seen from the description that follows that the weight of the distal end of welding gun 26 along with welding cables 22 assists in holding a welding gun 26 in place within the electrode holder 32. The weld gun 26 may be held by the electrode holder 32 at an angle substantially different from horizontal. In the context of the subject invention, substantially different from horizontal may refer to an angle formed between that clutched portion of the weld gun 26 and a horizontal axis of the welder 10, which may fall in the range between about 10° and 60°. However, alternate embodiments are contemplated wherein the range of angles may exceed 60°. Alternatively, welding gun 26 may be held substantially parallel with respect to the horizontal axis of the welder 10. Substantially parallel in this case may mean that the welding gun 26 is held within +10° to −10° relative to the horizontal axis of the welder 10.

Still referring to FIG. 2, in one particular embodiment, electrode holder 32 may be comprised of first and second supporting arms 44, 48. The first and second supporting arms 44, 48 may be spaced apart from distal sides of the bracket 30, and more specifically the base portion 36. The first and second supporting arms 44, 48 may also be positioned substantially at one end of the base portion 36, which may be the top of the base portion 36. The first and second supporting arms 44, 48 may extend transversely from the base portion 36. More specifically, the first and second supporting arms 44, 48 extend substantially perpendicular with respect to the base portion 36. In this manner, the first and second supporting arms 44, 48 are generally parallel with respect to each other. Alternate embodiments are contemplated wherein the first and second supporting arms 44, 48 extend from the base portion 36 at an acute angle. Moreover, the angle of one supporting arm 44, 48 may extend from the base portion 36 at a substantially different angle than the other supporting arm 48, 44. It is noted here that the first and second supporting arms 44, 48 may angularly extend from the base portion 36 in any three-dimensional direction, i.e. roll, pitch, yaw. Stated differently, the supporting arms 44, 48 may not extend substantially perpendicular with respect to the base portion 36, but may for example be angled downward or from side to side.

It will be readily seen that, in a cantilevered configuration, the first and second supporting arms 44, 48 contact, i.e. support, the welding gun 26 on opposite sides. Accordingly, the first supporting arm 44 includes a first supporting surface 44a and the second supporting arm 48 likewise includes a second supporting surface 48a. It follows that the first supporting surface 44a faces in a first direction, which may be upward, and the second supporting surface 48a faces in a second opposite direction, which may be downward. In one embodiment, the first and second supporting surfaces 44a, 48a may be generally arcuate or concavely shaped. It should be appreciated that the shape of the first and second supporting surfaces 44a, 48a may correspond to the contour of the welding gun 26 at the area of supporting contact, which in this instance is also generally arcuate. Still other configurations of supporting surfaces 44a, 48a may be chosen that correspond or that do not correspond to the contour of the welding gun 26. Specific examples may include but are not limited to V-shaped supporting surfaces and generally linear supporting surfaces.

With reference once again to FIG. 2, the first and second supporting surfaces 44a, 48a may be positioned at different elevations along the height of the base portion 36. As previously mentioned, the electrode holder 32 retains the welding gun 26 in a cantilevered fashion, which may be angled with respect to a horizontal axis of the welder 10. Accordingly, the first supporting surface 44a may reside at a higher elevation than the second supporting surface 48a. Persons of ordinary skill in the art will appreciate that the angle at which the welding gun 26 is retained is directly related to the difference in elevation between the supporting surfaces 44a, 48a, as well as the lateral distance between the spaced apart supporting arms 44, 48. It follows that first and second supporting arms 44, 48 may be constructed in a plurality of configurations for achieving the range of angles described above. All such combinations are to be construed as falling within the scope of coverage of the embodiments of the subject invention.

As mentioned above, the first and second supporting surfaces 44a, 48a may contact the weld gun 26 on opposite sides, which may be diametrically opposite sides spaced 180° apart. Alternate embodiments are contemplated wherein the points or surfaces of contact for the first and second supporting surfaces 44a, 48a are not diametrically opposed but arranged at various locations around the circumference of the weld gun 26. That is to say that the first and second supporting surfaces 44a, 48a contact the weld gun on separate hemispheres, but may be arranged at angles offset from 180°. For example, if the first supporting surface 44a contacts the weld gun 26 on a first side at a location designated by 0°, the second supporting surface 48a may contact the weld gun 26 on an opposing side at 135° or 225°, or at any location within the range of 135° to 225°. However any manner of supporting the welding gun 26 in a cantilevered fashion may be chosen without departing from the intended scope of coverage of the embodiments of the subject invention.

With continuing reference to FIG. 2, as mentioned above, bracket 30 further comprises a cable support 34 for managing storage of the welding cables 22 when not in use. The cable support 34 may extend from a second end of the base portion 36; that is to say with respect to the electrode holder 32. In one embodiment, the cable support 34 includes a cradling section, which may be continuously curved or incorporate a discrete number of planar surfaces. The cradling section, also termed cable cradle 34a, may extend from the base portion 36 and may be contiguously formed therewith. More specifically, the cable cradle 34a may be integrally formed with the base portion 36 as a unitary article, wherein the cradle is formed by shaping the material of the base portion 36 into a channel. It follows that the width W of the channel may be substantially the same as the width of the base portion 36. Still, the cable cradle 34a may have any width, cross sectional configuration or be configured in any manner suitable for retaining the welding cables 22.

From the above description, it will be readily seen that the bracket 30 including the electrode holder 32 and the cable support 34 provides a specific location for wrapping and storing the cables during transport or when not in use.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

I claim:

1. A welder used with an associated welding gun, comprising:
   a housing;
   at least one welding circuit received within the housing and first and second power output studs connected to the at least one welding circuit for establishing a welding arc;
   a generally rigid bracket affixed to an exterior of the housing, wherein the generally rigid bracket includes:
      first and second spaced apart support arms integrally formed with and extending from a first end of the generally rigid bracket, wherein the first support arm includes a first concave supporting surface facing a first direction, and wherein the second support arm includes a second concave supporting surface facing a second opposite direction for supporting the associated welding gun in a cantilevered configuration; and
      a cable cradle integrally formed with and extending from a second, distal end of the generally rigid bracket, wherein the cradle extends from the second, distal end of the generally rigid bracket to form a trough for receiving an associated cable.

2. The welder of claim 1, wherein the first supporting surface contacts the associated welding gun on a first side of the associated welding gun, and wherein the second supporting surface contacts the associated welding gun on a distal side of the associated welding gun.

3. The welder of claim 1, wherein the first supporting surface is at a same elevation, respective of the housing, than the second supporting surface.

4. The welder of claim 3, wherein the associated welding gun is characterized by a welding tip and wherein the welding tip is located more proximate to the second supporting surface than to the first supporting surface when the associated welding gun is engaged by the first and second support arms.

5. The welder of claim 3, wherein the first supporting surface is at a higher elevation, respective of the housing, than the second supporting surface.

6. The welder of claim 5, wherein the associated welding gun is characterized by a welding tip and wherein the welding tip is located more proximate to the second supporting surface than to the first supporting surface when the associated welding gun is engaged by the first and second support arms.

7. The welder of claim 1, wherein the associated welding gun is substantially parallel to the housing when the associated welding gun is engaged by the first and second support arms.

8. The welder of claim 1, wherein the welder is a MIG welder.

9. A holder for a welding gun used with a welder having a housing and at least one welding circuit received within the housing for establishing a welding arc, the holder comprising:
   a generally rigid bracket affixed to an exterior of the housing, wherein the generally rigid bracket includes:
      first and second spaced apart support arms integrally formed with and extending from a first end of the generally rigid bracket, wherein the first support arm includes a first concave supporting surface facing a first direction, and wherein the second support arm includes a second concave supporting surface facing a second opposite direction for supporting the associated welding gun in a cantilevered configuration; and
      a cable cradle integrally formed with and extending from a second, distal end of the generally rigid bracket, wherein the cradle extends from the second, distal end of the generally rigid bracket to form a trough for receiving an associated cable.

10. The welder of claim 9, wherein the first supporting surface contacts the welding gun on a first side of the welding gun, and wherein the second supporting surface contacts the welding gun on a distal side of the welding gun.

11. The welder of claim 9, wherein the first supporting surface is at a same elevation, respective of the housing, than the second supporting surface.

12. The welder of claim 11, wherein the welding gun is characterized by a welding tip and wherein the welding tip is located more proximate to the second supporting surface than to the first supporting surface when the welding gun is engaged by the first and second support arms.

13. The welder of claim 11, wherein the first supporting surface is at a higher elevation, respective of the housing, than the second supporting surface.

14. The welder of claim 13, wherein the welding gun is characterized by a welding tip and wherein the welding tip is located more proximate to the second supporting surface than to the first supporting surface when the welding gun is engaged by the first and second support arms.

15. The welder of claim 9, wherein the welding gun is substantially parallel to the housing when the welding gun is engaged by the first and second support arms.

16. The welder of claim 9, wherein the welder is a MIG welder.

17. A welder, comprising:
   a welding power source having at least one welding circuit for establishing a welding arc and a welding gun; and,
   supporting means for supporting the weld gun in a cantilevered fashion, wherein said supporting means is fixedly attached with respect to the welding power source wherein said supporting means comprises:
   first and second spaced apart support arms integrally formed with and extending from a base fixedly attached with respect to the welding power source wherein the first support arm includes a first concave supporting surface facing a first direction, and wherein the second support arm includes a second concave supporting surface facing a second opposite direction for supporting the associated welding gun.

18. The welder of claim 17, wherein said supporting means supports the weld gun in a cantilevered fashion at an angle substantially deviant from a horizontal axis of the welder.

19. The welder of claim 17, further comprising:
   a cable cradle integrally formed with and extending from said supporting means to form a trough for receiving an associated weld cable.

20. A bracket, comprising:
   a generally rectangular base which comprises first and second spaced apart support arms integrally formed with and orthogonally extending from said base, wherein the first support arm includes a first concave supporting surface facing a first direction, and wherein the second support arm includes a second concave supporting surface facing a second opposite direction for supporting an associated welding gun.

21. The bracket of claim 20, wherein said bracket supports a welding gun in a cantilevered fashion at an angle substantially deviant from a horizontal axis of an associated welder.

22. The bracket of claim 20, further comprising:
   a cable cradle integrally formed with and extending from said bracket to form a trough for receiving an associated weld cable.

* * * * *